US007079962B2

(12) United States Patent
Cornwall et al.

(10) Patent No.: US 7,079,962 B2
(45) Date of Patent: Jul. 18, 2006

(54) AUTOMATED UTILITY METER READING SYSTEM WITH VARIABLE BANDWIDTH RECEIVER

(75) Inventors: Mark K. Cornwall, Spokane, WA (US); Bruce N. Weyrauch, Spokane Valley, WA (US)

(73) Assignee: Itron, Inc., Spokane, WA (US)

( * ) Notice: Subject to any disclaimer, the term of this patent is extended or adjusted under 35 U.S.C. 154(b) by 0 days.

(21) Appl. No.: 10/970,738

(22) Filed: Oct. 20, 2004

(65) Prior Publication Data

US 2006/0085147 A1  Apr. 20, 2006

(51) Int. Cl.
*G01R 21/00* (2006.01)
(52) U.S. Cl. .............................. 702/62; 702/60; 702/65; 702/66; 702/77; 340/870.02; 340/870.04; 340/870.05; 340/870.06
(58) Field of Classification Search ............ 702/60–64, 702/77, 80, 57; 340/870.02, 870.1, 870.05, 340/870.01, 870.03, 870.04, 870.06, 870.07
See application file for complete search history.

(56) References Cited

U.S. PATENT DOCUMENTS

| 6,262,672 | B1 * | 7/2001 | Brooksby et al. | ......... 340/870.1 |
| 6,934,316 | B1 * | 8/2005 | Cornwall et al. | ............ 375/134 |
| 2004/0263352 | A1 * | 12/2004 | Cornwall et al. | ...... 340/870.02 |
| 2005/0024234 | A1 * | 2/2005 | Brooksby et al. | ......... 340/870.1 |
| 2005/0179561 | A1 * | 8/2005 | Osterloh et al. | ....... 340/870.02 |

OTHER PUBLICATIONS

Gumas, Charles Constantine, "Window-presumn FFT achieves high-dynamic range, resolution," *Personal Engineering & Instrumention News*, Jul. 1997, pp. 58-64.

* cited by examiner

*Primary Examiner*—John Barlow
*Assistant Examiner*—Hien Vo
(74) *Attorney, Agent, or Firm*—Perkins Coie LLP

(57) ABSTRACT

Methods and apparatus are disclosed for Automated Meter Reading (AMR) systems for determining quantities of a consumed utility product including electric, gas, and water service, using wireless data transfer. To compensate for the frequency drifts of the transmitters, these methods and apparatus, with minimum pre-processing of the received data, allow for on-the-fly adjustability of receiver bandwidth by merely changing a pre-calculated weighting function. As such, it is possible to use a fixed size Discrete Fourier Transform (DFT), or in particular a fixed N-point Fast Fourier Transform, for signals of different bandwidths.

20 Claims, 5 Drawing Sheets

AUTOMATED UTILITY METER READING SYSTEM WITH VARIABLE BANDWIDTH RECEIVER

TECHNICAL FIELD

The embodiments of the invention relate generally to an automated meter reading (AMR) system such as automated utility resource measurements, data collection, and exercise of control and notification, and more particularly to mobile or fixed AMR receivers for monitoring of utility consumption.

BACKGROUND

Historically the meter readings of the consumption of utility resources such as water, gas, or electricity has been accomplished manually by human meter readers at the customers' premises. The relatively recent advances in this area include collection of data by telephone lines, radio transmission, walk-by, or drive-by reading systems using radio communications between the meters and the meter reading devices. Although some of these methods require close physical proximity to the meters, they have become more desirable than the manual reading and recording of the consumption levels. Over the last few years, there has been a concerted effort to automate meter reading by installing fixed networks that allow data to flow from the meter to a host computer system without human intervention. These systems are referred to in the art as Automated Meter Reading (AMR) systems.

A mobile radio AMR system consists of three basic components: an Encoder-Receiver-Transmitter (ERT), a Data Collection Unit (DCU), and AMR Software. The ERT is a meter interface device attached to the meter, which either periodically transmits utility consumption data ("bubble-up" ERTs), or receives a "wake up" polling signal or a request for their meter information from a transceiver mounted in a passing vehicle or carried by the meter reader. The ERT, in response to a wake-up signal, broadcasts the meter number, the meter reading, and other information to the DCU, which is a mobile computer in, for example, the meter reading vehicle. The DCU collects the information from the ERTs for subsequent uploading into the AMR Software system. The AMR Software interfaces with the main system and updates the appropriate accounts of the billing system with the new meter readings.

Today's ERT signals are not synthesized and drift in frequency due to temperature changes, location of the ERT modules with respect to the other objects, and internal heating and pulling. The frequency shifts, in turn, create problems for a narrowband receiver. As such, wideband receivers are required to read ERTs, but wideband receivers are more prone to unwanted interference and other problems. One of the possible solutions for this problem is to synthesize the ERT signals as wideband signals. However, it is not possible to read a wideband ERT with a narrowband receiver.

DETAILED DESCRIPTION

Embodiments of the present invention relates generally to an AMR system such as automated utility resource measurements, data collection, and exercise of control and notification, and more particularly to AMR receivers that are adjustable to accept signals of different bandwidths. In light of the fact that there is certainly a need for a receiver that can easily and efficiently change its bandwidth to accommodate different transmitters while keeping the computational requirements relatively unchanged, the embodiments of this invention keep the signal processing computational requirements and complexity of the different bandwidths relatively constant. This is done by basic manipulation of the received data prior to Discrete Fourier Transform (DFT) or, in particular, prior to Fast Fourier Transform (FFT) operations.

In the following description, several specific details are presented to provide a thorough understanding of the embodiments of the invention. One skilled in the relevant art will recognize, however, that the invention can be practiced without one or more of the specific details, or in combination with or with other components, etc. In other instances, well-known implementations or operations are not shown or described in detail to avoid obscuring aspects of various embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Reference throughout the specification to "one embodiment" or "an embodiment" means that a particular feature, structure, implementation, or characteristic described in connection with the embodiment is included in at least one embodiment of the present invention. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Figure 1:
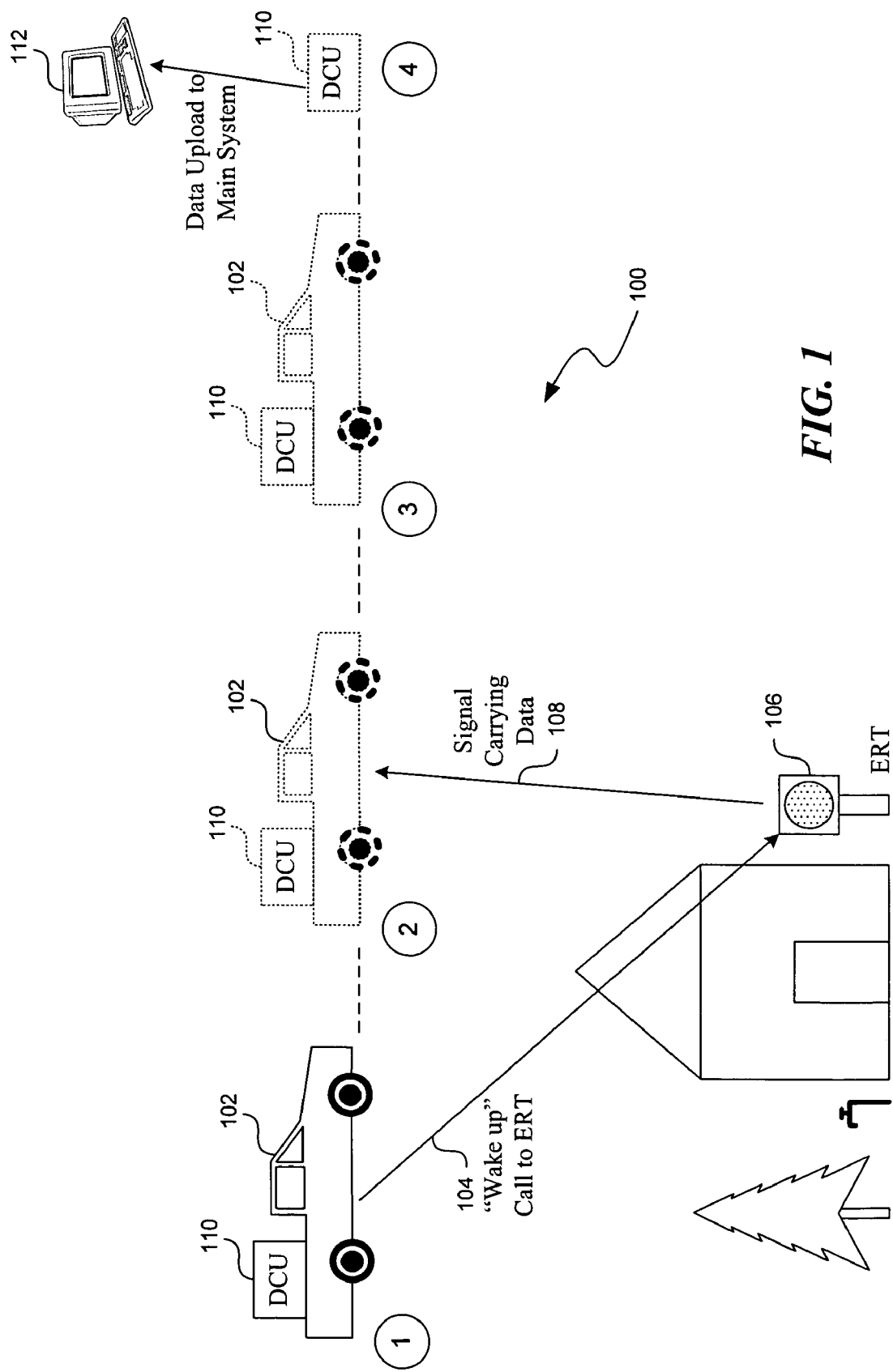
FIG. 1 illustrates the basic elements and processes of a mobile AMR system.

FIG. 1 illustrates the basic elements and processes of a typical mobile AMR system. As illustrated in FIG. 1, a passing data-collecting vehicle 102 first sends a wake-up signal 104 to each ERT, such as ERT 106. Upon the receipt of the wake-up call 104, each ERT transmits the required information 108, which is subsequently received by a DCU 110 of the passing vehicle 102. Afterward, the received ERT signal goes through several signal-processing steps and the embedded data is retrieved from it. Finally, the retrieved data may be uploaded from the DCU 110 to a main system or computer 112 for billing and other purposes.

In general, if a receiver, such as the one included in the DCU 110, utilizes an N-point FFT to process a synthesized narrowband ERT signal, the same receiver may use an M×N-point FFT to process another ERT's signal with a bandwidth M times narrower. Alternatively, a receiver may use the same N-point FFT to merely process every $K^{th}$ point of the FFT output (where K is an integer multiple of 2), which is called "decimation" of the FFT.

Figure 2:
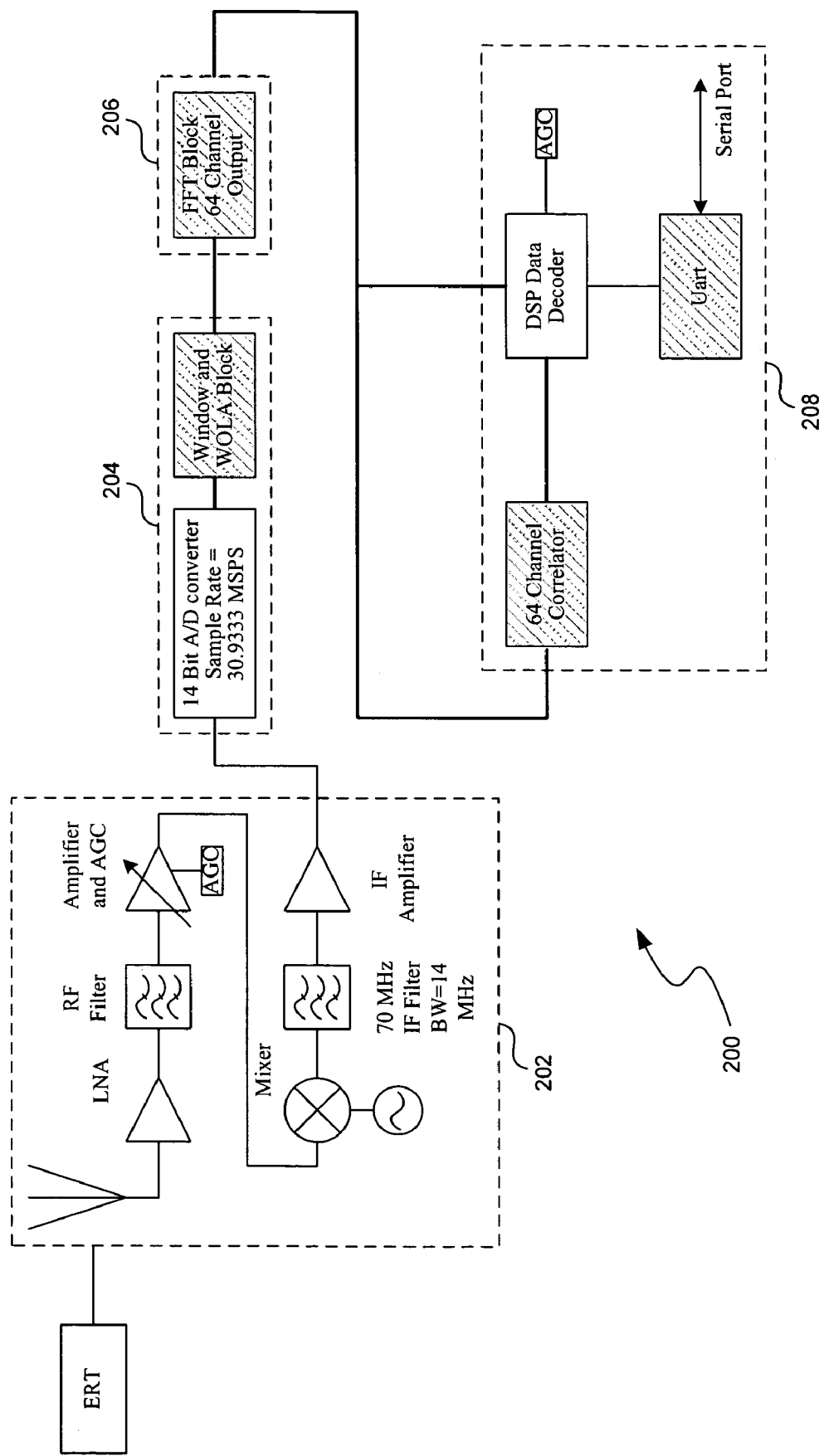
FIG. 2 is a high level schematic diagram of the signal path within a typical AMR system.

FIG. 2 is a high level schematic diagram of a signal path within an AMR system. As depicted in FIG. 2, a receiver 202 portion of the DCU 110 receives the ERT 106 transmitted signal 108. As part of the receiving process the received signal is passed through a low-noise amplifier LNA before Radio Frequency (RF) filtering of the signal. The gain of the RF filtered signal will be subsequently controlled by passing it through an automatic gain controller AGC, after which the signal goes through a mixer and filtered again by an intermediate filter of 70 MHz. This signal is again amplified by an IF amplifier before being input to block 204. After some pre-processing on the signal under block 204 (described below), such as sampling, scaling, parsing, and combining, the resulting data points go through some form of transformation such as under an FFT 206. Subsequently, the transformed data is decoded and embedded information is deciphered under block 208, to be later uploaded into the main system 112. In block 208, the digital signal processing (DSP) of the data comprises inputs from the channel correlator and an automatic gain controller, before the processed data becomes available on a serial port through a universal asynchronous receiver-transmitter UART.

Gumas, in his paper titled "Window-presum FFT achieves high-dynamic range, resolution", which is incorporated by reference, mathematically shows that the mere computation of every $M^{th}$ point of an FFT output can be achieved by partitioning the M×N data points into M equal data groups (where M is an integer multiple of 2), overlapping and adding them together, and processing the resulting N data points by an N-point FFT. Furthermore, prior to such partitioning, the wideband signal can be multiplied by a window function to scale different segments of its spectrum. It is known to those skilled in the relevant arts that a windowed FFT serves as a filter bank of uniformly spaced and shaped digital filters, and the window itself is the filters' impulse response.

Figure 3:
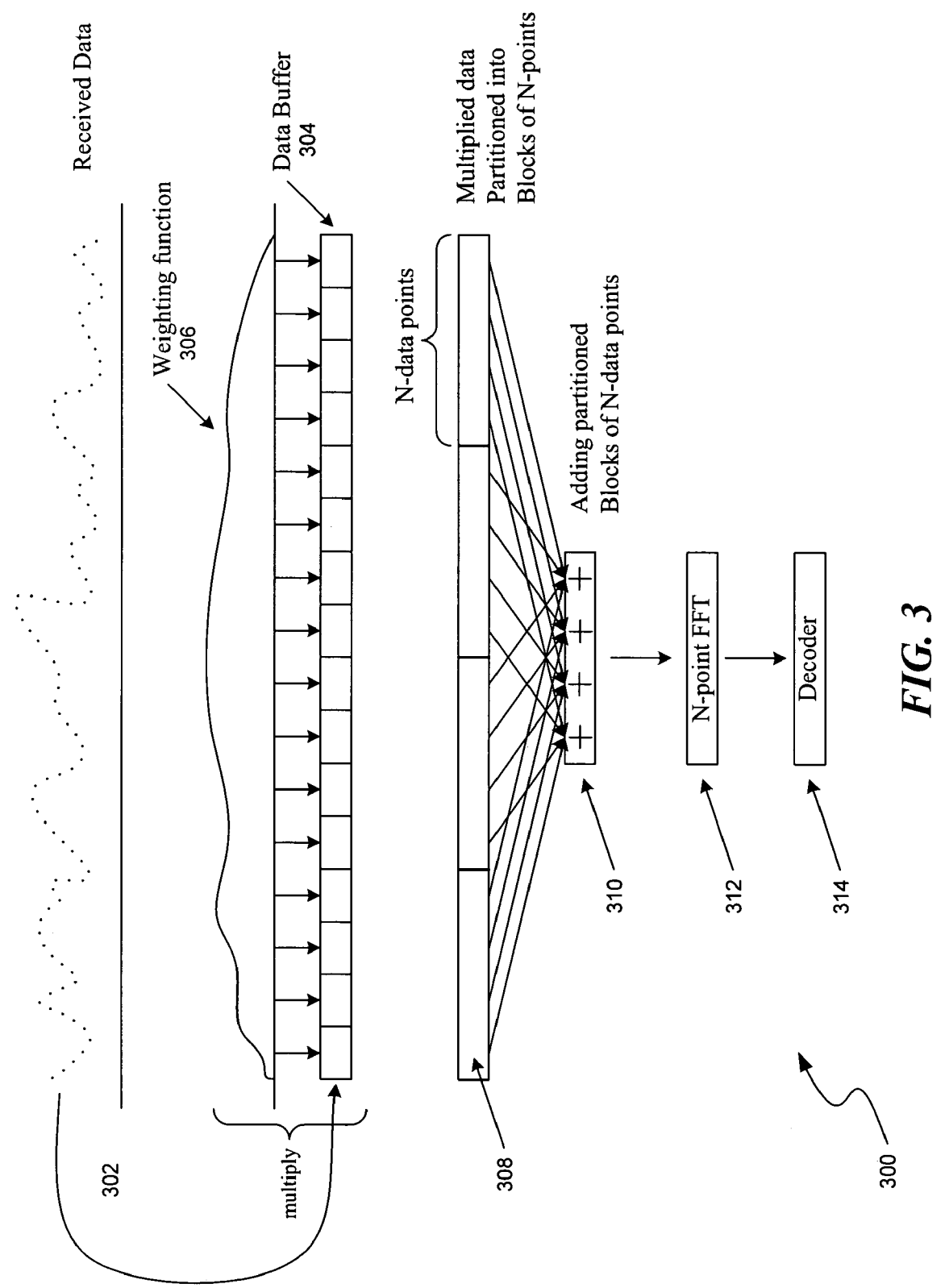
FIG. 3 is a schematic diagram of the windowing, partitioning, overlaping, adding, and the FFT processing of the Weighted Overlap-Add (WOLA) method.

FIG. 3 is a schematic diagram of the windowing, partitioning, overlapping, adding, and the FFT processing of the Weighted Overlap-Add (WOLA) method. In FIG. 3 the sampled data 302 is loaded into an input buffer 304. During the next step of the process, the data residing in the buffer 304 is multiplied by a weighting function 306, which represents the windowing process, to produce multiplied data 308. Subsequent to the multiplication of the buffer 304 data with the weighting function 306, the multiplied data 308 is partitioned into M groups of data, each having N-data points. Afterward, the M groups are all overlapped and all corresponding data points of all groups are added together to form one resulting group with N-data points, 310. This N-data-point group resulting from the addition process, 310, will later enter an N-point FFT (block 312) before being decoded (block 314).

Embodiments of the present invention take advantage of this mathematical concept to process a range of narrow to wideband signals by a fixed N-point FFT while the entire computation process remains the same for all bandwidths (except for the value of a multiplier). Each multiplier is a windowing function, which is pre-calculated and stored in a memory. Therefore, the embodiments can process the signals of various bandwidths by performing the exact same operations except for using a different memory content in one of its steps. Therefore, with this method, a mere change of a multiplier adjusts the receiver bandwidth for receiving a wider- or a narrower-band signal.

Figure 4:
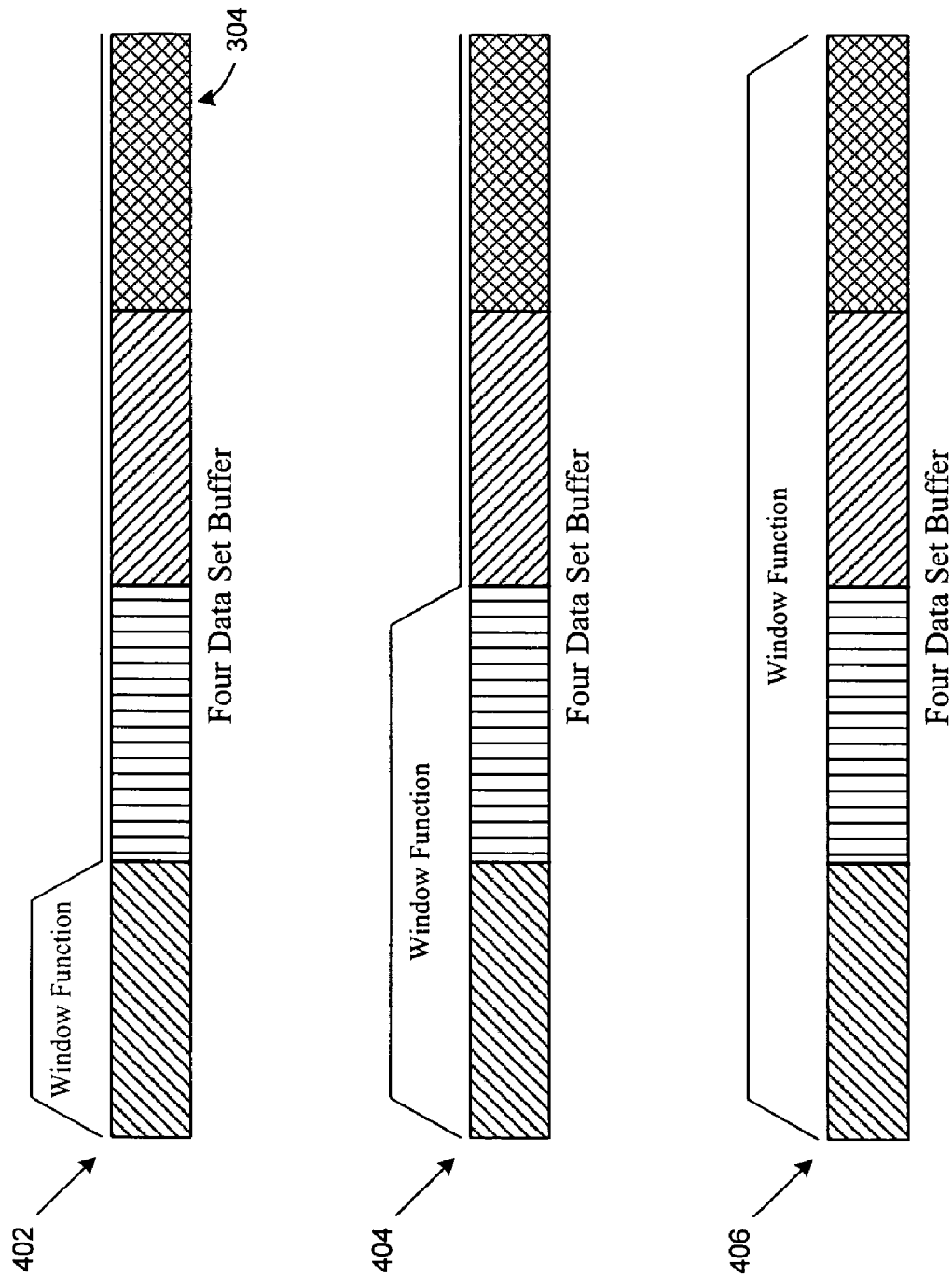
FIG. 4 is a schematic diagram of an application of four window functions in accordance with an embodiment of the invention.

FIG. 4 is a schematic diagram of the application of four window functions in accordance with an embodiment of the invention. In this embodiment an input buffer 304 is used to hold 4N input data points at all times, regardless of the input signal bandwidth, while an N-point FFT processes the data after it is multiplied by a weighting function, partitioned, overlapped, and added together. For example, if a narrow window is desired for an incoming wideband ERT signal, a window can be formed to only multiply the first N datapoints of the buffer while the other 3N points are multiplied by zeros (or very small numbers), 402, before partitioning, overlapping, adding, and passing through the N-point FFT. If a wide window is desired for a narrowband ERT signal, a window can be formed to multiply the entire 4N datapoints, 406, of the buffer before partitioning, overlapping, adding, and passing through the N-point FFT. Yet other windows can be formed to cover 2N data points of the buffer and multiply the rest by zeros or very small numbers, such as that shown at 404.

According to this embodiment a fixed size input buffer (e.g. 4N) and a fixed size FFT process (N-point FFT) is used to process a wide range of bandwidths. In effect, this process can reduce any bandwidth by as much as 4 fold. All it requires is to address a memory containing a new pre-calculated window function to multiply with the buffer entries. Data oversampling may be considered to prevent problems such as aliasing.

Figure 5:
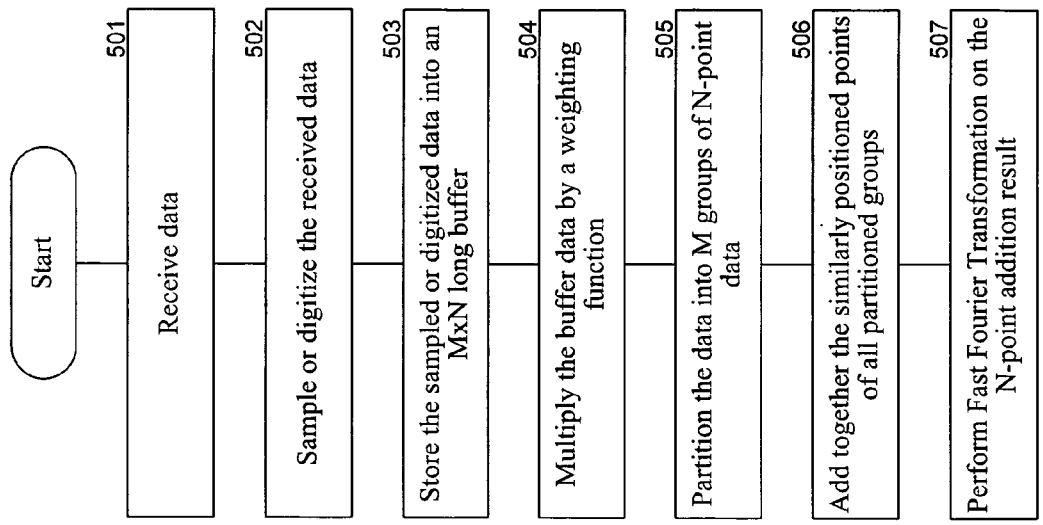
FIG. 5 is a flow diagram of the proposed method in accordance with an embodiment of the invention.

FIG. 5 is a flow diagram of the proposed method in accordance with an embodiment of the present invention. At block 501 a data collecting unit, such as a DCU, receives the signal transmitted by a data transmitting unit, such as an ERT. At block 502 the received signal is sampled. At block 503 the sampled data enters into an input buffer; for example an M×N-point input buffer, where N is the FFT process size and M is an integer. At block 504 the buffer data content is multiplied by a window (weighting) function which may contain (M−1)N, (M−2)N, . . . , or (M−M)N zeros or very small numbers reflecting the bandwidth. At block 505 the multiplied data is parsed into M groups of N-point data. At block 506 the N-point data groups are combined together, such as being added together in a manner that: the $1^{st}$, $(N+1)^{th}$, $(2N+1)^{th}$, . . . , $[(M-1)N+1]^{th}$ points of the buffered data are added together and $2^{nd}$, $(N+2)^{th}$, $(2N+2)^{th}$, . . . , $[(M-1)N+2)]^{th}$ points are added together and $3^{rd}$, $(N+3)^{th}$, $(2N+3)^{th}$, . . . , $[(M-1)N+3)]^{th}$ points are added together, up to and including $N^{th}$, $(N+N)^{th}$, $(2N+N)^{th}$, . . . , $[(M-1)N+N)]^{th}$ points of the buffered data. And, at the block 507, the result of combining the segments is mathematically transformed to another domain, such as with an FFT process.

It is important to recognize that the different aspects of the present invention apply to both fixed and mobile receivers, and that the mention of one does not exclude the other. An example of a fixed receiver is an AMR system mounted on an erected pole to facilitate the meter reading of its surrounding utility customers.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims. For example the invention is not limited to AMR.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. In a utility meter reading system having multiple utility meters wirelessly transmitting utility meter data to a mobile or fixed wireless receiver, an adjustable bandwidth automated meter reading system, comprising:

an encoder-receiver-transmitter (ERT) connected to each of the utility meters, wherein the ERT is configured to receive and wirelessly transmit utility metering data with respect to consumption of at least one utility resource; and a mobile or fixed data collection unit comprising a receiver and a signal processing resource, wherein the receiver is configured to wirelessly receive the transmitted utility metering data, and wherein the signal processing resource is configured for performing N-point Fast Fourier Transformation (FFT), wherein the data collection unit:

stores the received data into an M×N long buffer, where M is an integer;

multiplies the buffered utility meter data by a window function, wherein the window function contains no zeros, one zero, or a plurality of zeros depending on how much the bandwidth is to be adjusted;

partitions the multiplied data into M equal segments, where each segment has N points;

adds similarly positioned points of all the segments together such that the most significant points of all the M segments are added together, the second most significant points of all the segments are added together, and likewise adds together other similarly situated points of the segments; and performs N-point FFT on the N-point results of the additions to enable the adjustable bandwidth meter reading system to carry out signal processing on narrow bandwidth data to broadband data up to M×N points long.

2. The adjustable bandwidth automated meter reading system of claim 1, wherein N represents the widest bandwidth of the receiver.

3. An adjustable bandwidth automated wireless utility meter reading system, comprising:

a transmitter connected to the utility meter; and a receiver;

wherein the receiver includes an N-point Fast Fourier Transform (FFT) signal processing resource configured to:

receive the utility meter data provided by the transmitter;

store the received data into an M×N long buffer;

multiply the buffer data by a window function, wherein the window function contains no zeros, one zero, or a plurality of zeros depending on how much the bandwidth is to be adjusted;

partition the multiplied data into M equal segments, where each segment has N points;

add similarly positioned points of all the segments together to form an N-point result, such that the $1^{st}$, $(N+1)^{th}$, $(2N+1)^{th}$, ..., $[(M-1)N+1]^{th}$ points of the buffered data are added together, the $2^{nd}$, $(N+2)^{th}$, $(2N+2)^{th}$, ..., $[(M-1)N+2]^{th}$ points are added together, the $3^{rd}$, $(N+3)^{th}$, $(2N+3)^{th}$, ..., $[(M-1)N+3]^{th}$ points are added together, up to and including $N^{th}$, $(N+N)^{th}$, $(2N+N)^{th}$, ..., $[(M-1)N+N)]^{th}$ points of the buffered data; and perform N-point FFT on the N-point results of the additions, which enables the utility meter reading system to carry out signal processing on any data of up to M×N points long.

4. A wireless utility data communication system for automatic utility meter reading, the data communication system comprising:

a receiver for receiving encoded utility meter data; and a signal processing facility with a mathematical transformation capability, wherein the signal processing facility is configured or programmed to:

read the received utility meter data into a buffer;

mathematically manipulate the buffered utility meter data, wherein the mathematical manipulation comprises multiplication of the buffer data by a weighting function;

partition the manipulated utility meter data into segments;

combine the segmented and partitioned utility meter data; and mathematically transform the combined utility meter data.

5. The wireless utility data communication system of claim 4, wherein the signal processing facility is a digital signal processor (DSP).

6. The wireless utility data communication system of claim 4, wherein the mathematical transformation is an N-point Fast Fourier Transform operation.

7. The wireless utility data communication system of claim 4, wherein the data buffer is M×N long and the utility meter data is partitioned into M equal segments of N-point data, and wherein N represents the widest bandwidth of the receiver.

8. The wireless utility data communication system of claim 4, wherein the combination of the partitioned data of the M segments comprise adding together similarly positioned points of all the M segments, such as adding the least significant points of all the segments together, and the most significant points of all the segments together, and likewise the other similarly situated points of all the segments.

9. The wireless utility data communication system of claim 4, wherein the mathematical transformation of the combined data comprises a Fourier Transform operation on the combined data.

10. In a utility meter reading system having multiple utility meters wirelessly transmitting utility meter data to a wireless receiver, a combination of elements for providing an adjustable bandwidth receiver comprising:

a step for receiving utility meter data from at least one of the multiple utility meters;

a step for manipulating the received utility meter data;

a step for parsing the manipulated data into segments;

a step for combining the segmented data; and a step for performing mathematical transformation on the combined data, wherein the step for performing mathematical transformation on the combined data comprises performing Fast Fourier Transform on the combined data.

11. The combination of elements of claim 10, wherein the step for manipulating the received utility meter data comprises multiplying the data by a weighting function, and wherein the window function contains no zeros, one zero, or a plurality of zeros depending on how much the bandwidth is to be adjusted.

12. The combination of elements of claim 10, wherein the step for parsing the manipulated data into segments comprises dividing the data into M groups of N-point data, wherein M is an integer and N represents the widest bandwidth of the receiver.

13. The combination of elements of claim 10, wherein the step for combining the segmented data comprises adding together the similarly positioned bits of all the segments, such as adding the least significant bits of all the segments together, and the most significant bits of all the segments together, and likewise the other similarly situated points of all the segments.

14. An adjustable bandwidth wireless data communication method for use with an automated utility meter data reading system, comprising:

receiving the utility meter data;

storing the received utility meter data into a buffer;

mathematically manipulating the stored data by multiplying the buffer data with a weighting function;

partitioning the manipulated data into segments;

combining the partitioned data by adding the partitioned data together point-by-point; and mathematically transforming the combined data through Fourier Transformation.

15. The method of claim 14, wherein the window function contains no zeros, one zero, or a plurality of zeros depending on how much the bandwidth is to be adjusted.

16. The method of claim 14, wherein partitioning the data into segments comprises dividing the data into M groups of N-point data, wherein M and N are integers.

17. The method of claim 14, wherein adding the partitioned data point-by-point comprises adding together the similarly positioned points of all the segments, such as adding the least significant points of all the segments together, and the most significant points of all the segments together, and likewise the other similarly situated points of the segments.

18. The method of claim 14, wherein Fourier Transformation of the combined data comprises performing Discrete Fourier Transformation on the combined data.

19. A wireless automated utility meter data reading system, comprising:

a means for receiving the utility meter data;

a means for storing the received utility meter data;

a means for mathematically manipulating the stored data, wherein the mathematical manipulation comprises multiplication of the stored data by a weighting function;

a means for partitioning the manipulated data into segments;

a means for combining the partitioned data; and a means for mathematically transforming the combined data, wherein the means for mathematically transforming the combined data comprises performing Fast Fourier Transform on the combined data.

20. An adjustable bandwidth wireless data communication method for use with an automated utility meter data reading system, comprising:

receiving the utility meter data;

sampling or digitizing the received data storing the sampled or digitized data into an M×N long buffer;

multiplying the buffer data by a weighting function;

partitioning the data into M groups, where each group includes N points;

adding together the similarly positioned points of all the segments to form an N-point result, wherein each $n^{th}$ point of the N-point result, where n=1, 2, 3, . . . , N, is computed using:

$$\sum_{m=1}^{M} [(m-1)N + n]; \text{ and}$$

and performing Fast Fourier Transformation on the N-point addition result.

* * * * *